Nov. 6, 1956 R. L. ROPIEQUET 2,769,905
SWEEP CIRCUIT
Filed Aug. 18, 1953 2 Sheets-Sheet 1
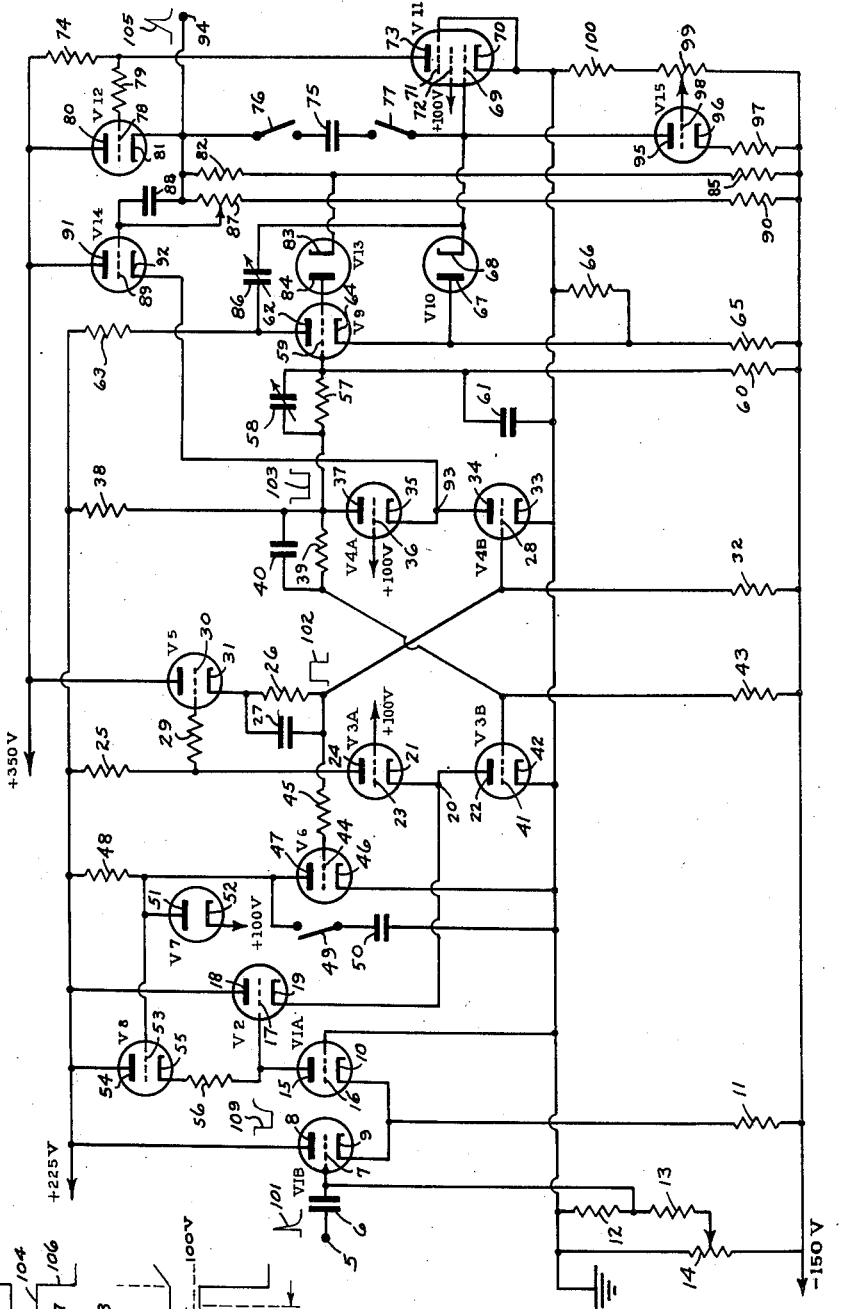
INVENTOR.
Richard L. Ropiequet
BY
Agent Nov. 6, 1956  R. L. ROPIEQUET  2,769,905
SWEEP CIRCUIT
Filed Aug. 18, 1953  2 Sheets-Sheet 2
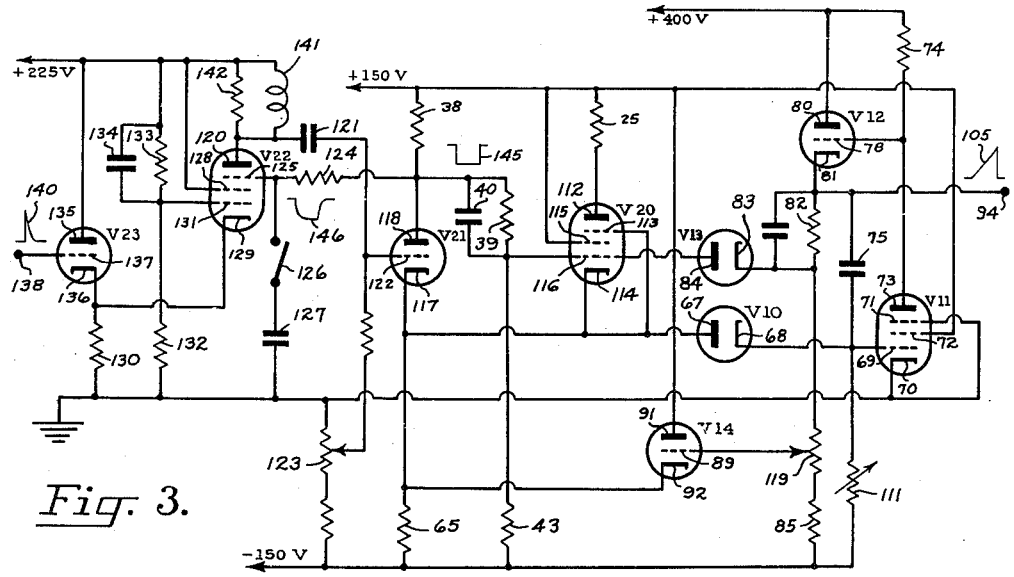
Fig. 3.
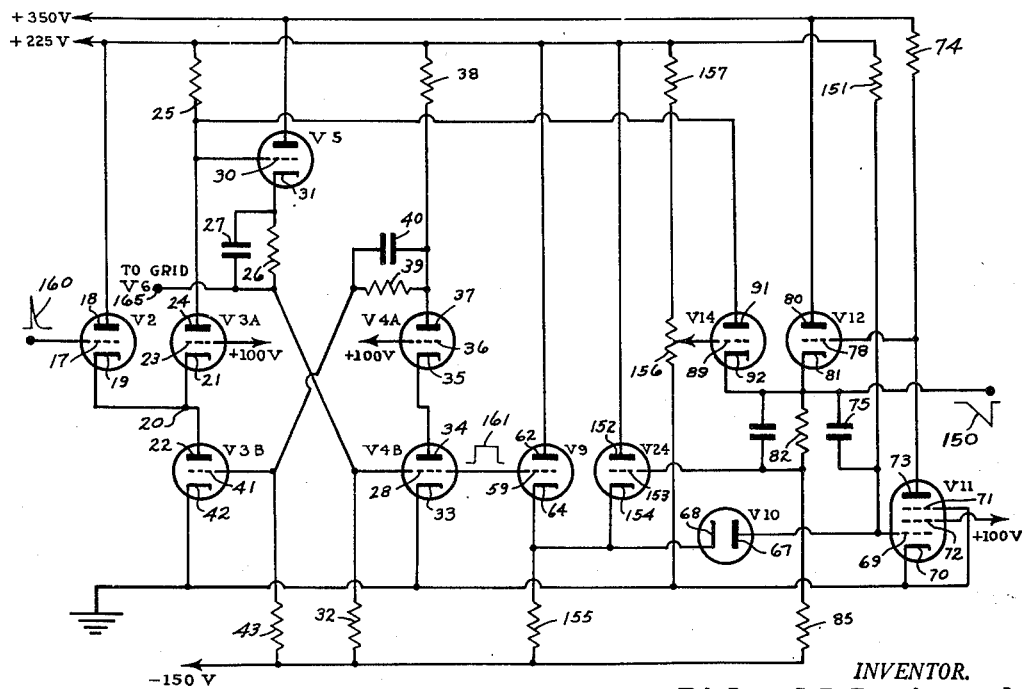
Fig. 4.
INVENTOR.
Richard L. Ropiequet
BY 
Agent

United States Patent Office 2,769,905
Patented Nov. 6, 1956

2,769,905

SWEEP CIRCUIT

Richard L. Ropiequet, Portland, Oreg., assignor to Tektronix, Inc., Portland, Oreg., a corporation of Oregon Application August 18, 1953, Serial No. 374,957

12 Claims. (Cl. 250—27)

This invention pertains to sweep circuits, and relates particularly to a circuit arrangement for producing a sawtooth waveform of precise configuration.

It is a principal object of the present invention to provide a sweep circuit having a range of operation substantially greater than provided heretofore.

Another important object of this invention is the provision of a sweep circuit which is extremely stable in operation, being free from triggering jitter and not subject to timing errors with varying repetition rate.

A further important object of the present invention is to provide a sweep circuit characterized by greater ease of synchronization with signals and at higher frequencies than accommodated heretofore.

A still further important object of this invention is the provision of a sweep circuit particularly adapted for use in cathode-ray oscilloscopes for the precise and stable presentation of waveforms on the cathode-ray tube screen.

The foregoing and other objects and advantages of the present invention will appear from the following detailed description taken in connection with the accompanying drawings, in which:

Figure 1 is a schematic diagram of a sweep circuit embodying the features of the present invention;

Figure 2 is a graph showing the various waveforms and their time relation with respect to each other, as utilized in the electrical circuitry of Figure 1;

Figure 3 is a schematic diagram of a modified form of sweep circuit embodying the features of the present invention; and Figure 4 is a schematic diagram of a still further modified form of sweep circuit embodying the features of the present invention.

Stated broadly, the sweep circuit of the present invention involves the cooperative association of a hold-off circuit, a trigger-actuated multivibrator and a gated sweep generator in such manner that a trigger potential actuates the multivibrator which, in turn, actuates the sweep generator to produce a sawtooth waveform, the waveform itself functioning to revert the multivibrator and terminate the sweep waveform, and the reverting of the multivibrator functioning to actuate the hold-off circuit to prevent trigger potentials from re-triggering the multivibrator for a period of time sufficient to permit the sawtooth waveform and the multivibrator to become fully recovered.

Referring to Figure 1 of the drawings, wherein is shown a preferred form of the sweep circuit of the present invention, input terminal 5 is connected through capacitance 6 to the grid 7 of the B section of a cathode-coupled amplifier V1. The plate 8 of this section is connected to a positive potential, as shown and the cathodes 9 and 10 of sections V1B and V1A, respectively, are connected through resistance 11 to a negative potential. The grid of section V1B is connected through resistance 12 to ground and through resistance 13 to a bias control potentiometer 14 for establishing the proper D. C. resting level of the plate 15 of section V1A.

The grid 16 of section V1A is grounded, while the plate of said output section is connected to the grid 17 of cathode follower V2. The plate 18 of the cathode follower is connected to a positive potential, as shown.

The cathode 19 of tube V2 is connected to the junction 20 of the direct connection between the cathode 21 and plate 22 of tubes V3A and V3B, respectively, which form the normally conducting side of a cascode bistable multivibrator. The grid 23 of tube V3A is connected to a positive potential, as shown. The plate 24 of tube V3A is connected through resistance 25 to a positive potential. This plate is also connected through the parallel combination of resistance 26 and capacitor 27 to the grid 28 of the B section of multivibrator tube V4 which forms the normally non-conducting side of the multivibrator. This connection is preferably made through resistance 29 and the grid 30 and cathode 31 of cathode follower tube V5, as shown.

Cathode follower V5 functions as a buffer between the plate 24 of multivibrator tube V3A and all other external loads. Thus, the only additional capacitance presented is the input capacitance of the cathode follower itself. In this manner the plate 24 of amplifier tube V3A is permitted to rise in potential at a much higher rate of speed than otherwise afforded.

The grid 28 of tube V4B is also connected through resistance 32 to a negative potential, as shown. The cathode 33 of tube V4B is connected to ground. The plate 34 of tube V4B is connected to the cathode 35 of the A section of the normally non-conducting side of multivibrator tube V4. The grid 36 of tube V4A is connected to a positive potential as shown. The plate 37 of tube V4A is connected through resistance 38 to a positive potential and also through the parallel combination of resistance 39 and capacitor 40 to the grid 41 of the B section of the normally conducting multivibrator tube V3. The cathode 42 of tube V3B is grounded. The grid 41 of tube V3B is also connected through resistance 43 to a negative potential, as shown.

The grid 28 of the B section of the normally non-conducting multivibrator tube V4 is connected to the grid 44 of triode tube V6 through resistance 45 which isolates the input capacitance of tube V6 from the multivibrator. The cathode 46 of tube V6 is grounded, while the plate 47 thereof is connected through resistance 48 to a positive potential. The plate of tube V6 is also connected through switch 49 and timing capacitor 50 to ground. Resistance 48 and capacitor 50 function as an RC network for purposes explained in detail hereinafter.

The plate of tube V6 is also connected to the plate 51 of diode V7, the cathode 52 thereof being connected to a positive potential as shown. The plate of tube V6 is also connected to the grid 53 of cathode follower tube V8. The plate 54 of this cathode follower is connected to a positive potential and the cathode 55 is connected through resistance 56 to the plate 15 of the output section V1A of the cathode-coupled amplifier.

The plate 37 of the A section of the normally non-conducting multivibrator tube V4 is connected through the parallel combination of resistance 57 and variable capacitor 58 to the grid 59 of cathode follower V9. This grid is also connected through resistance 60 to a negative potential and through capacitor 61 to ground. The plate 62 of tube V9 is connected through resistance 63 to a positive potential, and the cathode 64 thereof is connected through resistance 65 to a negative potential and through resistance 66 to ground.

The cathode 64 of cathode follower tube V9 is also connected to the plate 67 of diode V10, and the cathode 68 of said diode is connected to the control grid 69 of sweep generator tube V11. The cathode 70 and suppressor grid 71 are grounded, and the screen grid 72 is connected to a positive potential, as shown. The plate 73 of tube V11 is connected through resistance 74 to a positive potential.

The plate 73 of tube V11 is also connected to its control grid 69 through timing capacitor 75 by means of switches 76 and 77, and preferably through cathode follower tube V12. The grid 78 of this cathode follower is connected to the plate 73 of tube V11 preferably through resistance 79 which functions as a parasitic suppressor. The plate 80 of cathode follower V12 is connected to a positive potential, as shown, and the cathode 81 is connected to switch 76.

The cathode 81 of tube V12 is also connected through resistance 82 to the cathode 83 of diode V13, the plate 84 of which is connected to the grid 59 of cathode follower tube V9. The cathode 83 of diode V13 is also connected through resistance 85 to the negative potential indicated. Variable capacitor 86 is connected between the plate 62 of cathode follower V9 and the cathode 68 of diode V10 for purposes of neutralizing the capacity of the latter.

The cathode 81 of cathode follower V12 is also connected through potentiometer 87 and capacitor 88 to the grid 89 of cathode follower V14. The potentiometer is connected through resistance 90 to a negative potential, as shown. The plate 91 of tube V14 is connected to a positive potential and the cathode 92 is connected to junction 93 of the connection between the cathode 35 and plate 34 of the respective A and B sections of the normally non-conducting multivibrator tube V4. The cathode 81 of cathode follower V12 is also provided with terminal 94 to which various means may be connected for utilizing the sawtooth waveform generated at tube V11.

The grid 69 of tube V11 is also connected to the plate 95 of constant current tube V15. The cathode 96 of this tube is connected through resistance 97 to the negative potential indicated, and the grid 98 of this tube is connected to potentiometer 99 which is connected at one end to the negative potential and at the opposite end through resistance 100 to ground.

The operation of the sweep circuit described hereinbefore and under the conditions of potential exemplified in the drawing is as follows: Let it be assumed that a trigger pulse 101, amplified at tube V1 and impressed via cathode follower V2 upon the junction 20 of the cathode-plate connection of the normally conducting multivibrator tube V3, is capable of triggering the multivibrator only when the plate 15 of amplifier tube section V1A is in the vicinity of +100 volts. Under this condition, current is diverted from the normally conducting side of the multivibrator, producing a positive step 102 which is coupled to the grid 28 of the B section of the normally non-conducting multivibrator tube V4. This positive gate thus causes the multivibrator to flop over, with conduction on the said normally non-conducting side.

During conduction of the normally non-conducting side of the multivibrator, tube V6 also conducts to discharge the timing capacitor 50. At the end of conduction of the normally non-conducting side of the multivibrator, tube V6 is cut off and its plate 47 begins to rise toward +225 volts. However, the charge period of capacitor 50 is slow, being determined by the values of resistance 48 and said capacitor, and therefore the rise in plate voltage is delayed. When the plate of tube V6 reaches 100 volts it is clamped to this voltage by diode V7. As stated hereinbefore, the trigger amplifier V1 is so designed that it will trigger the multivibrator only when its plate 15 is in the vicinity of 100 volts, and therefore triggering of the multivibrator is prevented during the slow rise of the plate of tube V6 to 100 volts. In this manner any trigger signal applied at terminal 5 during the recovery time of the multivibrator will not re-trigger the latter since the recovery time is much faster than the charging time of capacitor 50.

The negative gate 103 produced by conduction of the normally non-conducting multivibrator tube V4 is applied to the grid 59 of cathode follower V9. During the quiescent period of the multivibrator, as indicated by the voltage level 104 of the negative gate 103, the grid of cathode follower V9 is held in a positive direction and the grid 69 of sweep generator tube V11 is held at −3 volts, with its plate 73 at +50 volts. However, with the production of the negative step 103, by flopover of the multivibrator, the resulting lowering of the voltage on the grid of cathode follower V9 simultaneously cuts off the diodes V10 and V13. That is to say, upon conduction of the normally non-conducting multivibrator tube V4, the plate 37 of V4A functions to cut off diode V13, while the following cathode 64 of tube V9 cuts off diode V10.

The negative gate 103 disconnects the grid 69 of the sweep generator tube V11 from a D. C. feedback loop between the plate 73 and grid 69 of said tube V11. This feedback loop extends from plate 73 through cathode follower V12 and diode V13, through cathode follower V9 and diode V10 back to the grid 69 of tube V11. The feedback loop is operative under conditions wherein both of the diodes V10 and V13 are conducting, and this condition occurs during the quiescent period of the sweep, i. e. with the normally conducting side V3 of the multivibrator conducting and cathode follower tube V9 also conducting.

Because of the D. C. feedback loop the grid 69 is established at a potential which defines the quiescent voltage of plate 73. Thus, when the D. C. feedback loop is disconnected by the gating waveform 103 the sawtooth waveform run-up starts without a step.

As stated hereinbefore, the negative step 103 disconnects the grid 69 of the sweep generator tube V11 from the D. C. feedback loop, and thus the grid 69 immediately begins to drop in voltage and the plate 73 begins to rise. Since the plate 73 is coupled back to the grid through the timing capacitor 75, said plate rises in voltage in accordance with the linear charge rate of the capacitor 75 and the amount of constant current provided by tube V15. When diode V10 disconnects the grid 69 from the D. C. feedback loop, constant current tube V15 sustains the current at a constant value, thereby pulling the grid 69 downward. Thus, during the run-up period, i. e. the development of the sawtooth waveform 105, the timing capacitor charging current is kept essentially constant.

When the plate 73 of the sweep generator tube V11 has risen to the vicinity of 200 volts, the grid 89 of cathode follower V14 has risen to about 100 volts. At this point, current begins to flow in this tube and current is diverted from the presently conducting side V4 of the multivibrator, whereupon the latter reverts to its initial stage with the normally conducting tube V3 conducting. Upon reversion of the multivibrator in the aforegoing manner, the grid 59 of cathode follower V9 is caused to rise, whereupon diode V10 conducts and ultimately the grid 69 of tube V11 returns to its initial potential of −3 volts and the plate 73 returns to its initial starting level, as explained more fully hereinafter.

It is to be noted that during the run-up producing the sawtooth waveform 105 by the linear rise in potential of plate 73 of tube V11, the capacitor 75 is caused to charge. Grid 69 of tube V11 is maintained at an essentially constant value by the A. C. feedback loop from plate 73 through capacitor 75. Thus, since the grid is the voltage point determining the amount of charging current, it will be seen that constant current tube V15 may be replaced by resistances without significantly affecting the constancy of the charging current. In either case the slope of the sawtooth waveform 105 is determined by the values of capacitor 75 and the amount of constant current provided either by the setting of potentiometer 99 in the grid circuit of tube V15, or by the value of resistance substituted for said tube.

Upon reversion of the multivibrator, with conduction of cathode follower V9, the grid 69 of the sweep generator tube V11 is pulled abruptly upward to a slightly positive bias, thereby suddenly increasing the plate current of said tube. Accordingly, plate 73 instantly drops in voltage. However, there is a disconnect action in the sweep output cathode follower V12 because it has a capacity load and therefore cannot fall until the capacitor 75 discharges. The discharge path of this capacitor is through diode V10 and cathode follower V9, and during said discharge diode V13 is still cut off, because its cathode was at a level of about 100 volts at the termination of the sweep. Diode V13 will not begin to conduct until its cathode voltage is lowered. Hence, the D. C. feedback loop is inoperative until the sweep 105 recovers its quiescent level at +50 volts. At this time diode V13 will conduct to lower the voltage on the grid 59 of cathode follower V9 and thereby bring the start of the sweep to +50 volts.

In Figure 2 of the drawings there are shown the various waveforms described hereinbefore arranged relative to each other in proper time relation to illustrate the action described in detail hereinabove. The trigger signal 101 triggers the multivibrator to produce the positive step 102 which causes the multivibrator to flop over with production of the negative step 103 impressed upon the grid 59 of cathode follower V9. The starting edge 106 of this negative step initiates operation of the sweep generating tube V11 to produce the linearly rising sawtooth sweep 105. When this sawtooth sweep reaches a predetermined level, as explained hereinbefore, it causes the multivibrator to revert with termination of the negative gate as indicated at 107, which, in turn, terminates the sweep, as indicated at 108.

During conduction of the normally non-conducting tube V4, amplifier tube V6 also conducts and its plate drops in voltage to produce the negative gate 109. Upon reversion of the multivibrator, tube V6 is cut off and its plate begins to rise toward +225 volts in an exponential manner determined by the RC network comprising resistance 48 and capacitor 50. Since it is desired to prevent a trigger signal 101 from retriggering the multivibrator during recovery of the latter and during the exponential recovery time T' of the sawtooth sweep voltage, it will be understood that the value of said RC network is so chosen that the rise in voltage along the exponential curve 110 involves a time T which is greater or at least as great as the time T'. Furthermore, it will be understood that the differentiated trigger signal 101 must have a negative slope greater than the positive slope of the exponential curve 110 in order to prevent the resulting sum of said potentials from being sufficiently positive to reach the illustrated triggering potential of 100 volts, indicated by the dotted line in Figure 2, before complete recovery of the sawtooth waveform and the hold-off waveform. At any time after the recovery time T a trigger signal, indicated at 101', applied at terminal 5 is capable of raising the plate 15 of amplifier tube section V1A to the illustrated 100 volt potential for triggering the multivibrator and repeating the cycle described hereinbefore.

In the event that it is desired to operate the sweep circuit in a free-running condition, potentiometer 14 may be adjusted to a value at which the exponentially rising potential 110 crosses the exemplified activation potential level of 100 volts indicated in Figure 2. At that instant the multivibrator will be caused to flop over in the same manner as is effected by a trigger pulse 101'. In either case actuation of the multivibrator and sweep generator are initiated by a trigger potential.

From the foregoing discussion it is believed to be apparent that the sweep circuit described hereinbefore affords many advantages heretofore not available. For example, the sweep circuit provides for a much wider range of operation by providing a multivibrator in which the period of operation is determined by the desired time sweep rather than by a fixed RC time constant, and in which multivibrator action is rendered completely stable by a hold-off circuit adapted to prevent premature retriggering by random or other trigger signals until the multivibrator and sweep generator have become fully recovered. Greater ease in synchronizing with trigger signals is achieved at much higher frequencies of operation since the multivibrator is triggered from the same point on a triggering waveform due to the arrangement of the hold-off circuit in conjunction with the multivibrator and because the sweep starts at the same level at all times since the hold-off circuit provides ample delay for the sweep generator to fully recover. Higher sweep speeds are accommodated because of the elimination of the step which occurs at the start of the sawtooth waveform in conventional sweep circuits.

The foregoing advantages are of considerable value in the operation of a cathode-ray oscilloscope since waveforms of substantially higher frequency than heretofore capable of being analyzed may be viewed without the usual disturbing factors such as triggering jitter, timing errors and movement of the waveform upon the screen.

Referring now to Figure 3 of the drawings, there is shown a modified form of sweep circuit embodying the features of the present invention. This modification is somewhat less precise in operation at high frequencies than the circuit illustrated in Figure 1 and it does not provide for the free-running operation available in the circuit of Figure 1. However, this modification is of practical utility for certain types of operation and its primary advantage resides in its simplicity of construction.

In the modification illustrated in Figure 3 of the drawings, the degenerative D. C. feedback loop is substantially the same as provided in Figure 1. It extends from the plate 73 of tube V11 through cathode follower V12 and diode V13, through the cathode follower section of V20 and thence back through diode V10 to the grid 69. The A. C. feedback loop between the plate 73 and grid 69 of tube V11 is also similar, being provided through cathode follower V12 and capacitor 75. The grid 69 is returned to a negative potential through potentiometer 111.

The pentode tube V20 provides the function of the multivibrator tubes V3 and the cathode follower tube V9 of Figure 1. Its plate 112 is connected through resistance 25 to a positive potential, the suppressor grid 113 and cathode 114 are connected to the plate 67 of diode V10, the screen grid 115 is connected to the positive potential and the control grid 116 is connected to the plate 84 of diode V13.

Tube V21 provides the function of multivibrator tubes V4 in Figure 1. Its cathode 117 is connected to the cathode 114 of tube V20 and its plate 118 is connected through resistance 38 to a positive potential. This plate is also connected through the parallel combination of resistance 39 and capacitor 40 to the grid 116 of tube V20. The grid is connected through resistance 43 to the negative potential indicated.

The cathodes 114 and 117 of tubes V20 and V21 are also connected through cathode follower V14 and potentiometer 119 and resistance 82 to the cathode 81 of cathode follower V12. Tube V14 provides the same function as in Figure 1 in coupling the output sawtooth waveform 105 back to the multivibrator for purposes of reverting the same, as explained hereinafter.

The plate 120 of pentode tube V22 is connected through capacitor 121 to the grid 122 of tube V21. This grid is also connected through potentiometer 123 between ground and the negative potential indicated, the potentiometer functioning to establish the proper D. C. potential for grid 122. The plate 118 of tube V21 is connected through resistance 124 to the suppressor grid 125 of tube V22. This suppressor grid is also connected through switch 126 and capacitor 127 to ground, the resistance 124 and capacitor 127 forming an R. C. network which provides the hold-off function described hereinafter.

Tube V22 provides the function of tubes V1A, V2, V6, V7 and V8 of the embodiment illustrated in Figure 1. The screen grid 128 is connected to a positive potential, as shown. The cathode 129 is connected through resistance 130 to ground and the control grid 131 is connected through resistance 132 to ground. This grid is also connected through the parallel combination of resistance 133 and capacitor 134 to the positive potential indicated.

The plate 135 of tube V23 is connected to a positive potential and the cathode 136 is connected to cathode 129 of tube V22. The grid 137 of tube V23 is connected to terminal 138 to which is applied a trigger signal 140 adapted to actuate the sweep circuit. The requirement of a differentiated trigger signal in the manner described in detail hereinbefore is provided in the circuit of Figure 3 by coil 141 arranged in parallel with resistance 142 connecting the plate 120 of tube V22 to positive potential.

The operation of the sweep circuit illustrated in Figure 3 is as follows: The circuitry of tubes V22 and V23 is designed to provide a potential at cathodes 129 and 136 which is less than the potential normally supplied to the suppressor grid 125. In this manner, plate 120 is not cut off by the suppressor grid under conditions when trigger signals 140 are desired to be made available for initiating the sweep circuit.

When a trigger signal 140, differentiated at 141, is applied to the grid 122 of tube V21, the plate 118 is reduced in potential and the negative waveform 145 thereby produced is coupled back through the R. C. network 124, 127 to the suppressor grid 125. This lowering of the suppressor grid potential cuts off the plate current of tube V22 and thereby prevents further trigger signals from being impressed upon the multivibrator during formation of the sawtooth waveform 105 and for a predetermined desired period of time following the termination of said waveform, in the manner previously described. During conduction of tube V21 the sweep generator tube V11 functions in the manner described hereinbefore to form the sawtooth waveform 105.

At the desired end of the sweep, i. e. at the potential defining the desired end of the sawtooth waveform, sufficient potential provided by said waveform is impressed upon the grid 89 of tube V14 to cause said tube to conduct and to raise the potential of cathode 117 of tube V21, thereby cutting this tube off and reverting the multivibrator, with conduction of tube V20. The plate 118 of tube V21 is also raised in potential, but this tube cannot conduct until a trigger signal is applied to the grid 122. Such a trigger signal is not available until complete recovery of the RC network 124, 127 because until that time the suppressor grid 125 is maintained at a lowered potential which maintains the plate 120 cut off. This hold-off waveform is indicated in Figure 3 by numeral 146.

Referring now to Figure 4 of the drawings, there is shown a still further modified form of sweep circuit which functions to provide a negative going sawtooth waveform 150, as distinguished from the positive sawtooth waveform 105 provided by the sweep circuits described hereinbefore. In this modification the degenerative D. C. feedback loop between the plate 73 and grid 69 of sweep generator tube V11 is through cathode follower V24 rather than through diode V13 in the modification of Figure 1. Additionally, the grid 69 is returned through resistance 151 to a positive potential, as indicated, rather than through the negative potential in the modification of Figure 1.

The plate 152 of tube V24 is connected to a positive potential, the grid 153 is connected through resistance 82 to the cathode 81 of cathode follower V12 and through resistance 85 to the negative potential indicated. The cathode 154 is connected to the cathode 68 of diode V10 and the plate 67 of said diode is connected to the grid 69 of tube V11. It is to be noted that in this modification the plate and cathode connections of diode V10 are reversed from that of the modification shown in Figure 1.

The grid 59 of cathode follower V9 is connected to the grid 28 of multivibrator tube V4B. The cathode 64 of tube V9 is connected to the cathode 154 of cathode follower V24, these cathodes being connected through resistance 155 to a negative potential, as shown.

Cathode 92 of amplifier tube V14 is connected to the cathode 81 of tube V12 and the plate 91 of tube V14 is connected back to the plate 24 of multivibrator tube V3A. The grid 89 of tube V14 is connected through potentiometer 156 and resistance 157 between a positive potential and ground, as indicated.

In the operation of the sweep circuit illustrated in Figure 4, a differentiated trigger signal 160 is impressed through cathode follower V2 to the junction 20 of the normally conducting side V3 of the multivibrator, in manner similar to the operation of the circuit in Figure 1. The positive step 161 thus produced by the diversion of current from the normally conducting side V3 and applied to the grid 28 of multivibrator tube V4B is also applied to the grid 59 of cathode follower V9. This positive waveform cuts off diode V10, whereupon the run down action of sweep generator tube V11 commences to form the negative sawtooth sweep waveform 150. At the desired voltage level at which the sawtooth waveform is to terminate, tube V14 is designed to conduct, thereby lowering the potential at plate 91 and simultaneously lowering the potential of plate 24 of the normally conducting multivibrator tube V3A. This lowering of the potential at plate 24 causes the multivibrator to revert to its initial state, whereupon the negative sawtooth waveform 150 is terminated.

During the period of time in which the normally non-conducting side V4 of the multivibrator is conducting and the negative waveform 150 is being produced, and also for the period of time T' (Figure 2) during which the sawtooth waveform is recovering to its initial voltage level, the hold-off circuitry illustrated in Figure 1 and indicated in Figure 4 as being coupled by terminal 165 to the grid 28 of multivibrator tube V4B is functioning to prevent trigger signals 160 from being impressed upon the multivibrator, in manner explained in detail hereinbefore.

It will be apparent to those skilled in the art that many modifications and changes may be made in the circuit arrangements described and illustrated hereinbefore without departing from the spirit and scope of the present invention. Accordingly it is to be understood that the foregoing description is merely illustrative of the invention and is not to be considered as limiting the scope thereof.

Having now described my invention and the manner in which the same may be used, what I claim as new and desire to secure by Letters Patent is:

1. A trigger-actuated sweep circuit comprising a multivibrator, a sweep generator including an electron discharge device having a grid and a plate, a capacitance, means connecting the capacitance between said grid and plate, means connecting said grid to a source of potential, degenerative direct current feedback means connected between said grid and plate and including a pair of series connected diodes, means connecting the multivibrator between said diodes, means connecting the sweep generator electron discharge device output to the multivibrator, a resistance-capacitance network, means connecting said network to the multivibrator, and signal mixing means connecting said network and a trigger source to the multivibrator.

2. A trigger-actuated sweep circuit comprising a multivibrator, a sweep generator including an electron discharge device having a grid and a plate, a capacitance, cathode follower means connecting the capacitance between said grid and plate, means connecting the grid to a source of potential, degenerative direct current feedback means connected between said grid and plate including a pair of series connected diodes, means connecting the multivibrator between said diodes, means connecting the sweep generator electron discharge device output to the multivibrator, a resistance-capacitance network, means connecting said network to the multivibrator, and signal mixing means connecting said network and a trigger signal source to the multivibrator.

3. A trigger-actuated sweep circuit comprising a multivibrator, a sweep generator including an electron discharge device having a grid and a plate, a capacitance, means connecting the capacitance between said grid and plate, means connecting said grid to a source of potential, degenerative direct current feedback means connected between said grid and plate and including a pair of series connected diodes, means connecting the multivibrator between said diodes, means connecting the sweep generator electron discharge device output to the multivibrator, a resistance-capacitance network, means connecting said network to the multivibrator, and signal mixing means including a cathode follower connecting said network and a trigger source to the multivibrator.

4. A trigger-actuated sweep circuit comprising a multivibrator, a sweep generator including an electron discharge device having a grid and a plate, a capacitance, means connecting the capacitance between said grid and plate, means connecting said grid to a source of potential, degenerative direct current feedback means connected between said grid and plate and including a pair of series connected diodes, means connecting the multivibrator between said diodes, second cathode follower means connecting the sweep generator electron discharge device output to the multivibrator, a resistance-capacitance network, means connecting said network to the multivibrator, and signal mixing means connecting said network and a trigger source to the multivibrator.

5. A trigger-actuated sweep circuit comprising a multivibrator, a sweep generator including an electron discharge device having a grid and a plate, a capacitance, cathode follower means connecting the capacitance between said grid and plate, means connecting said grid to a source of potential, degenerative direct current feedback means connected between said grid and plate and including a pair of series connected diodes, means connecting the multivibrator between said diodes, second cathode follower means connecting the sweep generator electron discharge device output to the multivibrator, a resistance-capacitance network, means connecting said network to the multivibrator, and signal mixing means connecting said network and a trigger source to the multivibrator.

6. A trigger-actuated sweep circuit comprising a multivibrator, a sweep generator including an electron discharge device having a grid and a plate, a capacitance, cathode follower means connecting the capacitance between said grid and plate, means connecting said grid to a source of potential, degenerative direct current feedback means connected between said grid and plate and including a pair of series connected diodes, means connecting the multivibrator between said diodes, second cathode follower means connecting the sweep generator electron discharge device output to the multivibrator, a resistance-capacitance network, means connecting said network to the multivibrator, and signal mixing means including a third cathode follower connecting said network and a trigger source to the multivibrator.

7. A trigger-actuated sweep circuit comprising a multivibrator, a sweep generator including an electron discharge device having a grid and a plate, a capacitance, means connecting the capacitance between said grid and plate, means connecting said grid to a source of potential, degenerative direct current feedback means connected between said grid and plate and including the series combination of a first diode, the grid-cathode path of a cathode follower and a second diode, means connecting the multivibrator to the cathode follower, means connecting the sweep generator electron discharge device output to the multivibrator, a resistance-capacitance network means connecting said network to the multivibrator, and signal mixing means connecting said network and a trigger source to the multivibrator.

8. A trigger-actuated sweep circuit comprising a multivibrator, a sweep generator including an electron discharge device having a grid and a plate, a capacitance, means connecting the capacitance between said grid and plate, means connecting said grid to a source of potential, degenerative direct current feedback means connected between said grid and plate and including the series combination of a first diode, the grid-cathode path of a cathode follower and a second diode, means connecting the multivibrator to the cathode follower, second cathode follower means connecting the sweep generator electron discharge device output to the multivibrator, a resistance-capacitance network, means connecting said network to the multivibrator, and signal mixing means including a third cathode follower connecting said network and a trigger source to the multivibrator.

9. A trigger-actuated sweep circuit comprising a multivibrator, a sweep generator including an electron discharge device having a grid and a plate, a capacitance, means connecting the capacitance between said grid and plate, means connecting said grid to a source of potential, degenerative direct current feedback means connected between said grid and plate and including a pair of series connected diodes, means connecting the output of the normally non-conducting side of the multivibrator between said diodes, means connecting the sweep generator electron discharge device output to the normally non-conducting side of the multivibrator, a resistance-capacitance network, means connecting said network to the normally non-conducting side of the multivibrator, and signal mixing means connecting said network and a trigger source to the normally conducting side of the multivibrator.

10. A trigger-actuated sweep circuit comprising a multivibrator including two pairs of electron discharge devices, each pair defining a normally conducting side and a normally non-conducting side, each electron discharge device having a cathode, a grid and a plate, the cathode of one electron discharge device of each pair being connected to the plate of the other electron discharge device of the pair, the grid of one electron discharge device of the normally conducting side being connected to the plate of one electron discharge device of the normally non-conducting side, the plate of the other electron discharge device of the normally conducting side being connected to the grid of the other electron discharge device of the normally non-conducting side, a sweep generator including an electron discharge device having a grid and a plate, a capacitance, means connecting the capacitance between said grid and plate, means connecting said grid to a source of potential, degenerative direct current feedback means connected between said sweep generator grid and plate and including a pair of series connected diodes, means connecting the output of the normally non-conducting side of the multivibrator between said diodes, means connecting the sweep generator electron discharge device output to the cathode-plate connection of the normally non-conducting side of the multivibrator, a resistance-capacitance network, means connecting said network to the normally non-conducting side of the multivibrator, and signal mixing means connecting said network and a trigger source to the cathode-plate connection of the normally conducting side of the multivibrator.

11. A trigger-actuated sweep circuit comprising a multivibrator including two pairs of electron discharge devices each pair defining a normally conducting side and a normally non-conducting side, each electron discharge device having a cathode, a grid and a plate, the cathode of one electron discharge device of each pair being connected to the plate of the other electron discharge device of the pair, the grid of one electron discharge device of the normally conducting side being connected to the plate of one electron discharge device of the normally non-conducting side, first cathode follower means connecting the plate of the other electron discharge device of the normally conducting side to the grid of the other electron discharge device of the normally non-conducting side, a sweep generator including an electron discharge device having a grid and a plate, a capacitor, second cathode follower means connecting the capacitor between said grid and plate, means connecting the said grid to a source of potential, degenerative direct current feedback means connected between said grid and plate and including a pair of series connected diodes, means connecting the output of the normally non-conducting side of the multivibrator between said diodes, third cathode follower means connecting the sweep generator electron discharge device output to the cathode-plate connecting of the normally non-conducting side of the multivibrator, a resistance-capacitance network, means connecting said network to the normally non-conducting side of the multivibrator, fifth cathode follower means connecting said network to a trigger source, and sixth cathode follower means connecting the trigger source to the cathode-plate connection of the normally conducting side of the multivibrator.

12. A trigger-actuated sweep circuit comprising a multivibrator, a sweep generator including an electron discharge device having a grid and a plate, a capacitor connected between said grid and plate, resistance means connecting said grid to a source of positive potential, degenerative direct current feedback means connected between said grid and plate and including the series combination of the grid-cathode path of a first cathode follower and a diode, second cathode follower means connecting the multivibrator to the first cathode follower, third cathode follower means connecting the sweep generator electron discharge device output to the multivibrator, a resistance-capacitance network, means connecting said network to the multivibrator, and signal mixing means connecting said network and a trigger source to the multivibrator.

References Cited in the file of this patent

UNITED STATES PATENTS

| | | |
|---|---|---|
| 2,265,290 | Knick | Dec. 9, 1941 |
| 2,414,486 | Rieke | Jan. 21, 1947 |
| 2,569,164 | Greenwood et al. | Sept. 25, 1951 |
| 2,594,104 | Washburn | Apr. 22, 1952 |
| 2,661,421 | Talamini et al. | Dec. 1, 1953 |